United States Patent [19]

Siligoni et al.

[11] Patent Number: 5,440,612
[45] Date of Patent: Aug. 8, 1995

[54] METHOD AND DEVICE FOR MEASURING OPERATION PARAMETERS OF TELEPHONE SUBSCRIBER LINES AND ASSOCIATED INTERFACE CIRCUITS

[75] Inventors: Marco Siligoni, deceased, late of Milan, Italy, by Maria I. Marcioni, legal representative; Ferdinando Lari, Vimercate, Italy

[73] Assignee: SGS-Thomson Microelectronics s.r.l., Milan, Italy

[21] Appl. No.: 964,612

[22] Filed: Oct. 22, 1992

[51] Int. Cl.⁶ .............................................. H04M 1/24
[52] U.S. Cl. ........................................ 379/27; 379/30
[58] Field of Search ................................ 379/27–30, 379/24–26, 28, 29, 399, 27

[56] References Cited

U.S. PATENT DOCUMENTS

| | | | |
|---|---|---|---|
| 4,028,507 | 6/1976 | Hoppough | 179/175.3 |
| 4,392,026 | 7/1983 | Kojima et al. | 179/175.3 R |
| 4,782,507 | 7/1988 | Siligoni et al. | 379/27 |
| 4,800,589 | 1/1989 | Siligoni et al. | 379/413 |
| 5,046,089 | 9/1991 | Pariani et al. | 379/399 |
| 5,073,920 | 12/1991 | Masukawa et al. | 379/30 |
| 5,121,420 | 6/1992 | Marr et al. | 379/26 |
| 5,202,882 | 4/1993 | Rudolf | 370/17 |

FOREIGN PATENT DOCUMENTS

| | | |
|---|---|---|
| 112731 | 7/1984 | European Pat. Off. |
| 0281888 | 9/1988 | European Pat. Off. |
| 0543161 | 5/1993 | European Pat. Off. |
| 3215680 | 10/1983 | Germany |
| 2050114 | 12/1980 | United Kingdom |
| 2173072 | 10/1986 | United Kingdom |

OTHER PUBLICATIONS

Subscriber Line Interface Kit for L3000N and L3030 (Manual), SGS-Thomson Microelectronics, Sep. 1993.
Roche et al., "Electronic Borscht Circuits and the Local Network," NTG-Fachberichte ISSLS 80, (1980) vol. 73.

*Primary Examiner*—Stephen Chin
*Assistant Examiner*—Kevin Kim
*Attorney, Agent, or Firm*—Seed and Berry

[57] ABSTRACT

A method of measuring under running conditions operation parameters of an interface circuit and a telephone subscriber line connected to it, said interface circuit comprising a first integrated circuit operating on a high voltage with outputs connected to the line and second outputs on which transverse and longitudinal current values of the line are respectively present in normal operation, and a second integrated circuit operating on a low voltage between the first circuit and a telephone exchange, comprises the steps of: switching the outputs across an impedance of a predetermined value, and measuring through the first circuit the values of the currents present on the second outputs; switching said outputs back to across the line leads, and measuring through the first circuit the values of the transverse and longitudinal line current values; performing, for each measurement through the second circuit, a digital encoding of the measured values and transmitting such encoded values to the telephone exchange.

16 Claims, 2 Drawing Sheets

METHOD AND DEVICE FOR MEASURING OPERATION PARAMETERS OF TELEPHONE SUBSCRIBER LINES AND ASSOCIATED INTERFACE CIRCUITS

TECHNICAL FIELD

This invention relates to a circuit for and method of measuring, under running conditions, operation parameters of an interface circuit and of a telephone subscriber line connected to it, and more particularly to an interface circuit comprising a first integrated circuit operating on a high voltage and having first outputs connected to said line and second outputs on which transverse and longitudinal electric current values of the line appear respectively during normal operation, and a second integrated circuit operating on a low voltage between the first circuit and a telephone exchange.

BACKGROUND OF THE INVENTION

As is known, numerical switching telephone exchanges, or private branch exchanges commonly referred to as PABXs (Private Automatic Branch Exchanges) of the digital type, incorporate interfacing integrated electronic circuits intended for driving voice transmissions over a plurality of telephone subscriber lines.

Such interface circuits, which may be of a commercial type known as SLIC (Subscriber Line Interface Circuit), are connected between the telephone subscriber lines and the remaining circuitry internal of the telephone exchange, and operative to supply on the telephone line a given line voltage and current to suit the line resistive load.

Such devices, as well as the subscriber line itself, require periodical testing for functionality, which tests show to be most effective when carried out during routine operation of the system.

To enable such testing operations, the prior art has proposed some relays for connection in the line, using complicated sectioning and switching structures, so as to run the SLIC and subscriber line to a centralized apparatus adapted to take the various measurements on a remote basis.

The tests are normally carried out during night hours to make best use of the less dense line traffic.

This prior art approach, while achieving its objective and being at present the only one which is applied irrespective of the system electromechanical, hybrid, or fully electronic type, still has the disadvantage of requiring a large number of relays and switch contacts. These components are recognized to be cost-intensive and low in reliability.

Another disadvantage of that prior approach is that the remote central apparatus for taking the measurements cannot help being somewhat complicated circuit-wise if it is to analyze all of the signals that propagate from the sectioning relays over so-called transfer buses.

SUMMARY OF THE INVENTION

According to principles of this invention, a method and a circuit device are provided to enable measurement, under system running conditions, of various operation parameters of an interface circuit (SLIC-type) and of the telephone subscriber line connected to it, thereby overcoming the drawbacks with which the above prior art approach is beset.

According to one embodiment of the invention, an interface circuit is used for a testing apparatus and having information about said operation parameters transferred to a centralized controller over an existing electrical link for voice transfer.

The technical problem is solved by a method as indicated being characterized in that it comprises the steps of:

switching said outputs to the opposed ends of an impedance having a predetermined value;

measuring, by means of the first circuit, the values of the currents present on said second outputs;

again switching said outputs between leads in said line;

measuring, by means of said first circuit, the values of transverse and longitudinal currents of said line;

for each measurement, encoding the measured values in digital form, using said second circuit, and transmitting the values thus encoded to the telephone exchange.

The features and advantages of the inventive method will become more clearly apparent from the following detailed description of a circuit device implementing it, given by way of non-limitative example with reference to the accompanying drawings.

DETAILED DESCRIPTION OF THE INVENTION

Figure 1:
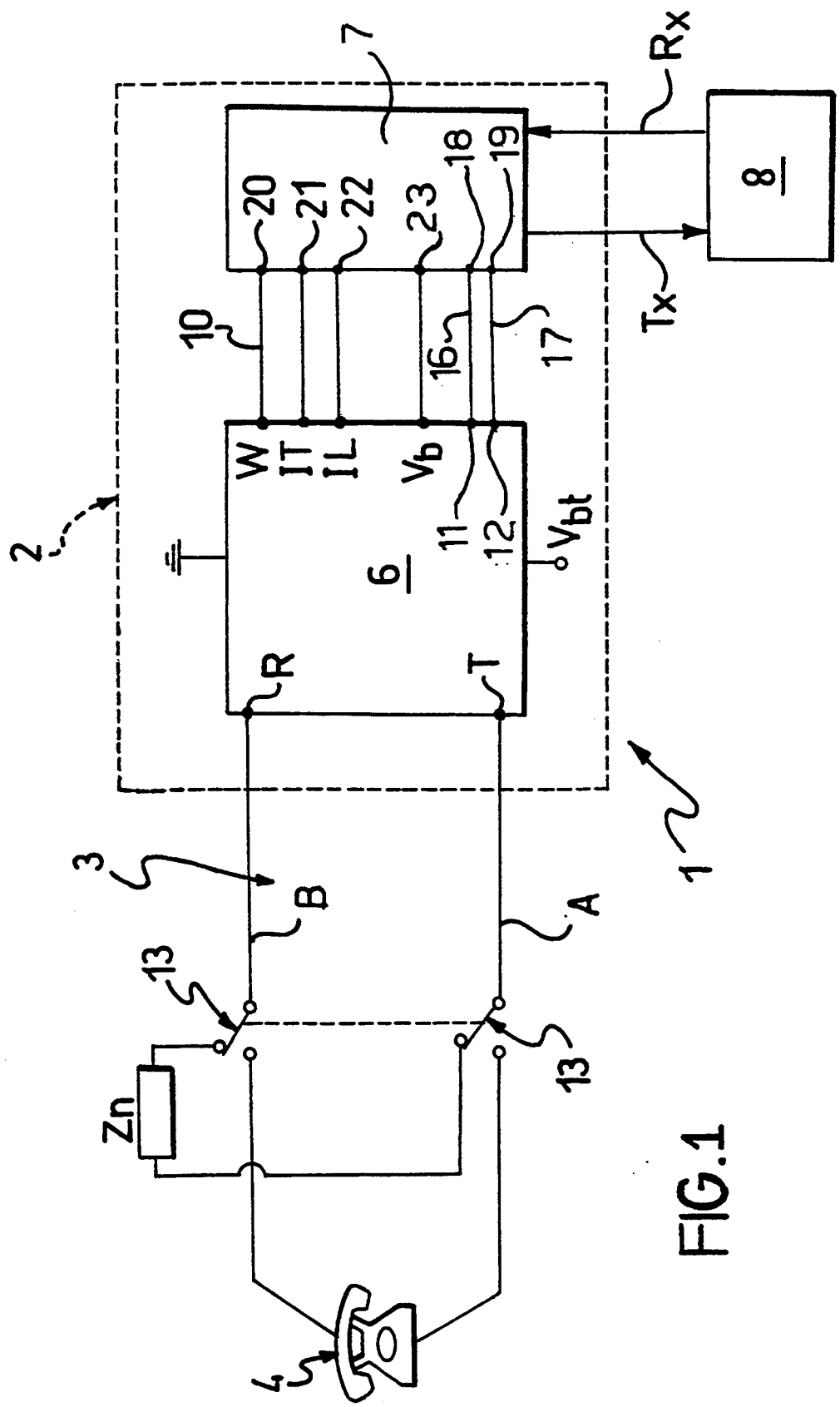
FIG. 1 is diagramatic view of the circuit device according to the invention.

With reference to the drawing figures, generally and schematically shown at 1 is a circuit device embodying this invention which is intended for measuring operation parameters of an interface electronic circuit 2 and of a telephone subscriber line 3 connected to it.

Such a circuit is known commercially as SLIC (Subscriber Line Interface Circuit) and comprises a first integrated circuit 6 operating on a high voltage, and a second or integrated control circuit 7 connected to the first circuit 6 and operating on a low voltage.

The telephone line 3 is a two-wire line and runs with one end to a telephone set 4, and with the other end, to a telephone exchange which also incorporates said interface integrated circuits 6 and 7.

Specifically, the high-voltage interface circuit 6 has a pair of outputs T (TIP) and R (RING) being each connected to a corresponding lead A, B in the line 3. The other or low-voltage circuit 7 is connected between the first circuit 6 and the remaining circuitry 8 of the telephone exchange.

The low-voltage circuit 7 is adapted to control the operation of the first circuit 6 and is also active in bi-directional communication with the remaining circuitry 8 internal of the telephone exchange to receive and transmit signals related to the subscriber's phone messages.

For the purpose, circuitry 8 is in bidirectional communication with that circuit 7 through links Rx and Tx of the bus type, over which links voice signals converted into a digital code of the PCM (Pulse Code Modulation) type are transmitted.

Internal of the interface circuit 6 is a bridge circuit structure which comprises two amplifier final stages 14, 15, across which stages the line 3, and the apparatus run thereto, is connected as the load. In the presence of a signal, such amplifiers will drive the line in a push-pull mode.

On the other hand, the interface circuits 6 and 7 are connected to each other by leads for data and/or signal transfer.

Specifically, a lead 10 connects an output 20 of circuit 7 to an enable input W of circuit 6.

A pair of outputs IT and IL of the first circuit 6 are connected to corresponding inputs 21, 22 of circuit 7 to transmit respective signals related to the transverse and longitudinal current of line 3 (as described, for example, in the Italian Patent No. 1,215,254 to this same Applicant).

A further output Vb of circuit 6 is connected to an input 23 of the second circuit 7 and supplies a voltage value which is proportional to a supply voltage Vbt of circuit 2.

The high-voltage circuit 6 is, in fact, powered between said voltage Vbt and the ground of a battery, is conventional.

Additionally, a pair of inputs 11 and 12 are connected, through leads 16 and 17, to corresponding outputs 18, 19 of circuit 7 to receive command signals related to measurement steps of the inventive method, as explained hereinafter.

Advantageously, according to the invention, sectioning and switching means 13 are provided on both leads A and B of the two-wire line 3, at the outputs T and R and the portion 6. Such means, which may consist of sectioning relays, are effective to switch said outputs T and R to opposed ends of an impedance Zn having a predetermined value.

Figure 2:
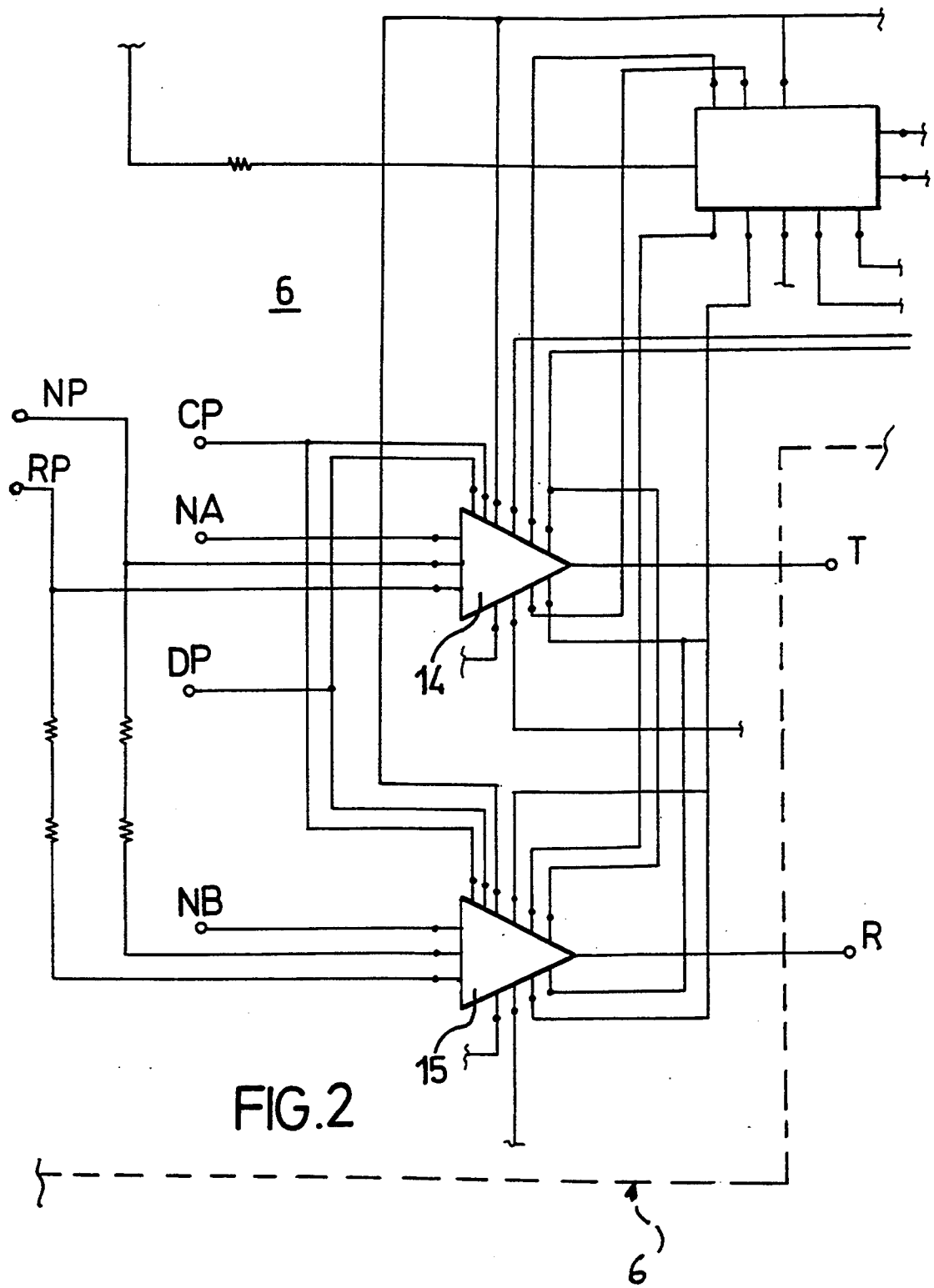
FIG. 2 is a diagramatic view of a detail of the device in FIG. 1.

With reference now to the circuit structure illustrated by FIG. 2, the device 1 of this invention comprises, as previously mentioned, two amplifier final stages 14, 15 whose outputs correspond to the outputs T and R of SLIC 6.

Said amplifiers 14, 15 are each provided with an enable input NA and NB, respectively, on which the polarity current is supplied. When the polarity current is zero, the amplifier output operates as a high impedance.

Among the several inputs to the amplifiers 14 and 15, those shown connected to the terminals NP and RP are noteworthy, which terminals are applied suitable voltage values for powering the line 3. A negative value (such as ground, as one example) potential appears on NP, whereas the potential value on RP is even more negative.

Each signal appearing on such terminals NP, RP is enabled, to the exclusion of the other, by a selection command being applied, as the case may be, to additional inputs CP or DP of amplifiers 14 and 15. As an example, under normal polarity conditions, the potential present on terminal NP is transferred to the output T of amplifier 14, and the potential present on terminal RP is transferred to the output R of amplifier 15. The reverse will occur when the polarity is reversed.

The command signals effective to produce the selection depend on the voltage values present on the inputs 11 and 12 of the high-voltage circuit 6. In particular, with a voltage of 3 Volts or more on input 12, the outputs R and T of the SLIC 2 will enter two different states dependent on which of two given voltage values, namely 0 and −3 Volts, is present on the other input 11.

Basically, there are provided within the high-voltage circuit 6 electronic means, known per se, for cutting off the polarization current applied to the input NA of amplifier 14 to force a state of high impedance on the output T.

Likewise, electronic means are arranged to cut off the polarization current applied to the other amplifier 15, re-activate at the same time the polarization current of amplifier 14, and activate the selection commands for the inputs CP and RP, with the result that the output R is brought to a state of high impedance, but with the battery reversed.

The integrated circuits 6 and 7 can be known commercial devices publicly available if desired. For example, circuit 6 can be integrated circuit L3000 and circuit 7 can be L3030, both chips being part of a subscriber line interfere chip set commercially offered for sale by SGS-Thomson Microelectronics. The pin connections between the chips and the outputs of the various pins based on changes to the inputs are described in published literature available to those of skill in the art. The details of the chips operating parameters, pin connections and suggestions on how to generally interconnect the chips, are described in published data sheets. For example, the amplifiers 14 and 15 are included on the L3000 as now commercially sold and pins on the chip allow control of these amplifiers in the manner described herein. The published literature on these and other suitable chips is in sufficient detail that, together with the description of this invention provided herein, one of ordinary skill in the art would be able to make and practice the invention.

The measuring method of this invention will now be described with reference to a starting condition wherein the circuit device 1 is in operation and test measurements are to be taken of some electrical parameters of the SLIC integrated circuit and the subscriber line.

1) Testing the Interface Circuits 6 and 7:

To test circuit 6 for operability, the outputs T and R are disconnected from line 3, using the switch means 13, and switched to the opposed ends of the impedance Zn.

Assume that Ia and Ib are the resultant currents on the leads A and B of line 3, then the relationship between such current values and the transverse current, It, and the longitudinal current, I1 present on the line can be found by an equation as follows:

$$It = (Ia + Ib)/k$$

$$Il = (Ia - Ib)/k$$

where k is a known constant of circuit 2.

By applying predetermined voltage values Vw to input W, the actual values of the transverse and longitudinal currents can be obtained on the outputs IT and IL, on the basis of which the device can be assessed for satisfactory operability.

The value of the transverse current It is, in fact, tied to the battery voltage value Vbt and characteristic constants of the SLIC circuit. Where the battery voltage is unknown, this can be found from the output Vb on which a proportional voltage to it is present.

On the other hand, the value of the longitudinal current I1, also referred to as the common mode current, should be coincident with the 0 value because the outputs R and T have been switched to the ends of the impedance Zn and are forcing the line current values Ia and Ib to equality.

By taking these measurements, proper powering of the line both with AC (voice and telefax bands) and DC (standby, activated, bell, etc; states) can be assessed irrespective of its operating state.

In addition, the control circuit 7 will convert the signals related to currents It and I1 to the digital form, and send them to the central circuitry 8 over the PCM encoded bus Tx.

The transmissive characteristics of the low-voltage control circuit 7 can also be measured by checking the chains of messages on the buses Rx and Tx and the so-called telephone fork attenuation.

2) Testing the Subscriber Line 3:

The checks to be performed on line 3 are as follows:

2.1) measuring the insulation resistance across leads A and B;

2.2) measuring the insulation resistance across leads A, B and ground;

2.3) measuring the line capacitance; and 2.4) measuring the RMS value of the current I1 present on the line.

These measurements will be discussed in detail herein below.

2.1) By switching the outputs R, T of circuit 6 back to line 3, the insulation measurement across the leads A and B can be taken by measuring the current level on output IT.

To ensure accuracy within microamperes of the measurement, two different DC voltage levels are driven into differential on the input W of circuit 6. Thus, any cause for inaccuracy due to offsets is removed.

2.2) To test the leads A and B for insulation toward ground, i.e. toward the battery ground, digital commands are issued from the telephone exchange 8 which will drive, through the low-voltage circuit 7, switching of the outputs R and T of SLIC 6 to a high-impedance state.

More particularly, when a voltage having a value 53 Volts is present on input 12, and the other input 11 is brought to a potential of 0 Volts, the polarization current applied to the input NA of amplifier 14 is cut off, and output T will be then driven to a state of high impedance.

Under this operating condition, to the other output R of the SLIC 2 there is applied approximately the same DC voltage as the battery voltage Vbt (−50 Volts), which allows the value of the current flowing through just lead B to be measured at the device output IT.

In quite a similar way, when the voltage value on input 11 is brought to −3 Volts, via lead 16 the interface circuit 2 changes over to a state in which output R is at a high impedance and lead A alone is alive.

Here again, a measurement of the current on IT will yield the value of the current through lead A.

The value read out from output IT should be filtered through a low-pass filter of the contributions from the longitudinal current which is surely present due to that, during the measurement, one of the two leads is held at a high impedance.

The information thus filtered is converted to the PCM coding by circuit 7 and passed to the telephone exchange 8 over bus Tx.

2.3) To measure the line capacitance, there is applied to input W a signal of known ramp gradient and, with both leads A and B alive, the value of output IT is again measured.

The capacitance of line CL is tied to the value of the transverse current by the following relation:

$$CL = (\text{Integral of } It*K/2)/(VL(t) - BL, It*K/2)$$

where, VL(t) is the line voltage, K is the scale factor, RL is the combined resistances of the line and the connected telephone apparatus.

2.4) The measurement of the RMS value of the longitudinal current can be obtained from output IL, as purposely set; thereby, it is only necessary to encode that information through the control circuit 7 which will then send the encoded information to the telephone exchange 8.

Switches 13 that control the connection of the lines A and B to the subscriber line can be controlled via integrated circuit 7. Alternatively, the switches 13 can be controlled by other circuits and the state of the switches appropriately provided to the circuits 6 and 7.

The method of this invention greatly simplifies the procedures for transferring the measurement data to the telephone exchange.

Such data are then made available in the PCM digital code with self-evident advantages from the data processing and storing standpoints.

What is claimed is:

1. A method of measuring, under running conditions operation parameters of an interface circuit and of a telephone subscriber line connected to it, with said interface circuit comprising a first integrated circuit operating on a high voltage with first outputs connected to said line and second outputs on which transverse and longitudinal electric current values of the line appear respectively during normal operation, and a second integrated circuit operating on a low voltage between said first integrated circuit and a telephone exchange, comprising the steps of:

switching said first outputs to the opposed ends of an impedance having a predetermined value;

measuring, by means of said first circuit, the values of the currents present on said second outputs;

again switching said first outputs from the opposed ends of said impedance to leads in said line;

measuring, by means of said first circuit, the values of transverse and longitudinal currents of said line;

for each measurement, encoding the measured values in digital form, using said second circuit, and transmitting the values thus encoded to the telephone exchange.

2. A method according to claim 1, characterized in that the second measurement step comprises alternatively driving each of said first outputs to a state of high impedance.

3. A method according to claim 2, characterized in that said state of high impedance is achieved by turning off a corresponding amplifier final stage incorporated in said first integrated circuit at each of said first outputs.

4. A method according to claim 3, characterized in that said amplifier final stage is turned off by cutting out the polarization current supplied thereto.

5. A method according to claim 2, characterized in that a measurement with one of said first outputs at a high impedance is taken in the reversed battery mode.

6. A method according to claim 1, characterized in that said digital form for encoding said measured values is of the PCM type.

7. A circuit device for measuring, under running conditions, operation parameters of an interface circuit and a telephone subscriber line connected to it, said interface circuit comprising a first integrated circuit operating on a high voltage with first outputs connected to the line and second outputs on which transverse and longitudinal current values of the line appear respectively during normal operation, and a second integrated circuit operating on a low voltage between the first circuit and a telephone exchange and providing selection command signals to said first integrated circuit, characterized in that with each of said outputs there corresponds an amplifier final stage having an enable input on which a polarization current is supplied, and a pair of power supply inputs respectively receiving a negative voltage value and another, even more negative value relative to ground, electronic means being arranged to link operatively said enable inputs and said power supply inputs to said selection command signals, whereby said outputs can be switched in a mutually excluding manner to respective states of high impedance and optionally with their polarities reversed.

8. A device according to claim 7, characterized in that said means are able to cut out the polarization current of said amplifier final stages.

9. A device according to claim 7, characterized in that said amplifier stages include additional selection inputs adapted to enable power supply of said amplifier stages with a selected polarity.

10. A circuit for measuring the operation parameters of a subscriber line and an interface circuit connected to the subscriber line comprising:

a first circuit connected to the subscriber line, the first circuit being capable of operating on the high voltage outputs of the subscriber line, and having a first pair of output lines, the first circuit outputting values corresponding to transverse current and longitudinal current values that appear on the first pair of output lines;

two amplifier final stage circuits connected as a part of the first circuit and being connected to a second pair of output lines, respectively;

a control circuit connected to the first circuit, the control circuit operating on a lower voltage than the first circuit;

a control line from the control circuit to the first circuit that controls the polarization of at least one of the amplifier final stages;

a preselected impedance value that is connectable to the second pair of output lines of the first circuit;

a switching circuit having switches that switch the connection of the second pair of output lines of the first circuit between the subscriber line and the preselected impedance value; and a sensing circuit for determining the value of the transverse current and the longitudinal current when the first circuit is connected to the subscriber line and also when the first circuit is connected to the preselected impedance value.

11. The circuit according to claim 10, further including:

a pair of power supply terminals as part of the first circuit; and a power supply, separate from the subscriber line power supply, for providing power to the pair of power supply terminals.

12. The circuit according to claim 10 wherein said first circuit is formed as a single integrated circuit and said control circuit is formed as a single integrated circuit on a separate substrate from the first integrated circuit.

13. The circuit according to claim 10, further including:

control lines from said control circuit to the switching circuit to select the position of the switches to be connected to either the subscriber line or the preselected impedance value.

14. The circuit according to claim 10, further including:

a selection input connected to said first circuit to enable a polarity change in the output of one of the amplifier final stages.

15. The circuit according to claim 10 further including a selection input connected to enable the turning off of one of the amplifier final stages to achieve a high impedance output.

16. The circuit according to claim 10 wherein each of the two amplifiers may be individually selected for placing either one or both in the high impedance state by turning them off.

* * * * *